Patented Sept. 2, 1952

2,609,304

UNITED STATES PATENT OFFICE 2,609,304

PLASTICIZED CELLULOSE TRIACETATE

Harry Jones, Rochdale, and John Kempton Aiken, Sale, England, assignors to The Geigy Company Limited, Manchester, England, a British company No Drawing. Application February 20, 1948, Serial No. 9,968. In Great Britain February 24, 1947

1 Claim. (Cl. 106—176)

This invention relates to improvements in plastic masses, such as foils, films, coating compositions, moulding compositions and the like.

Some thermoplastic substances are insoluble, or at best, difficultly and only slightly soluble in most of the solvents at present available. Further, some of those liquids which do have a solvent action may be unsuitable in respect of their volatility, toxicity or stability. Consequently the range of solvents and particularly of non-volatile solvents (i. e. plasticisers), suitable for the production of plastic or fluid compositions from such substances, is very limited.

Thus for example cellulose triacetate is potentially, an excellent material for plastic masses because of its heat and moisture-resistant properties. These properties are superior to those of the grades of cellulose acetate customarily employed in this art. Hitherto, however, its use has been restricted on account of its low solubility in volatile solvents, with the exception of halogen-containing toxic solvents, and on account of the lack of suitable non-volatile solvents or plasticisers.

The object of this invention is cellulose triacetate plasticized with a cyclic acetal of the following formula:

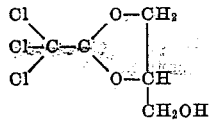

The cyclic acetals of the present invention may be prepared by the condensation of chloral with a polyhydric alcohol, having hydroxyl groups on adjacent carbon atoms, in the presence of a strong condensing agent such as concentrated sulphuric acid. Cyclic acetals so prepared and still containing a reactive group, such as hydroxyl, may be converted into yet further examples of suitable compounds by appropriate chemical modification, e. g. by esterification.

The cyclic acetals of the present invention provide a group of compounds among which there are to be found solvents and/or plasticizers for a wide range of thermoplastic substances such as cellulose esters e. g., cellulose acetate and cellulose acetobutyrate, cellulose ethers, polyvinyl choride, co-polymers of vinyl chloride and vinyl acetate, polyvinyl acetals, polystyrene, rubber and such synthetic elastomers as polymerised chlorobutadiene known commercially as "neoprene," or the range of alkylene polysulphides known commercially as "Thiokol."

The plasticized thermoplastic compositions of the present invention may be dissolved in volatile solvents to give solutions which may be employed as coating compositions or for the manufacture of foils or films by known methods.

Although the acetal grouping is normally unstable particularly to acid hydrolysis, the trichloromethyl group present in the compounds employed in the present invention appears to exert a powerful stabilising influence, and renders the compounds highly resistant to hydrolysis by either acid or alkali.

The chlorine atoms of the trichloromethyl group also appear to be very resistant to removal by hydrolysis. Thus the compounds employed in the present invention show little or no tendency to decompose, with consequent formation of hydrogen chloride, under moist conditions or on heating. For example the cyclic acetal of chloral with ethylene glycol i. e. trichloro methyl dioxolan

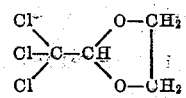

is stable to boiling aqueous alkalies and to boiling concentrated hydrochloric acid and is only slowly decomposed by hot concentrated sulphuric acid.

The amount of solubilising and/or plasticising agent incorporated with the thermoplastic substance depends upon the purpose for which the composition is to be used. As is well known, amounts of plasticizer exceeding 10% by weight of the thermoplastic substance are customarily employed. Amounts exceeding 50% are most common and amounts of 100% to 200% or even up to 400% are often used. In the case of compounds of higher molecular weight which are not miscible with the thermoplastic substance in all proportions, the miscibility will set an upper limit to the amount which can be employed.

The solubilising and/or plasticising agents of the present invention may be used alone or in conjunction with known plasticizers, fillers, colouring materials or stabilisers. They may be incorporated in the thermoplastic substances in the customary manner e. g., by intimately mixing the thermoplastic substance and the solubilising and/or plasticising agent at an elevated temperature on a heated roll mill or in an internal mixer.

The compounds employed in the present invention do not easily burn and are therefore of use in compositions where a low degree of combustibility is desirable.

The following table sets forth a number of the cyclic acetals of the present invention together with some of their general properties and examples of thermoplastic substances with which each acetal may be incorporated. In this table the symbol R represents the radical

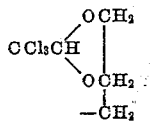

Example 2

100 parts of polyvinyl chloride, 60 parts of trichlormethyldioxolan, and 10 parts lead silicate are mixed on hot rolls at about 125° C. and the homogeneous mass thereby obtained is moulded at about 140° C. After cooling a light coloured relatively non-inflammable moulding is obtained.

Example 3

2 parts of cellulose triacetate (of combined acetic acid content 62.5%), 0.5 part of trichlorethylidene glycerol, and 10 parts of cyclopentanone are agitated together in an enclosed

Table

| Compound | | General Properties | Materials for which solvent and/or plasticising action is shown |
|---|---|---|---|
| Name | Formula | | |
| Trichloromethyldioxolan | CCl₃CH(OCH₂)(OCH₂) | White crystalline solid, M. P. 42° C. B. P. 200° C. | Cellulose acetate and triacetate, ethyl cellulose, polyvinyl chloride and chloride/acetate. |
| Trichlorethylidene glycerol or (4-hydroxymethyl 2-trichloromethyldioxolan 1:3). | CCl₃CH(OCH₂)(OCH)(HOCH₂) | Colourless viscous liquid B. P. 140° C. at 10 mm. | Cellulose acetate, triacetate, and acetobutyrate and ethyl cellulose. |
| 4-methyl 2-trichloromethyl-dioxolan 1:3. | CCl₃CH(OCH₂)(OCH)(CH₃) | Colourless liquid B. P. 208° C. | Cellulose triacetate, polyvinyl chloride and chloride/acetate. |
| 4-chloromethyl 2-trichloromethyldioxolan 1:3. | CCl₃CH(OCH₂)(OCH)(CH₂Cl) | Colourless liquid B. P. 129–133° C. at 14 mm. | Cellulose triacetate and acetobutyrate, ethyl cellulose, polyvinyl chloride and chloride/acetate, polyvinyl acetals, polystyrene, rubber, and the synthetic elastomers marketed under the names "Neoprene" and "Thiokol." |
| Trichlorethylideneglyceryl acetate. | R.OCOCH₃ | Colourless liquid B. P. 156–7° C. at 15 mm. | Cellulose triacetate and acetate. |
| Trichlorethylideneglyceryl benzoate. | R.OCOC₆H₅ | White crystalline solid, M. P. about 60° C. | Polyvinyl chloride and chloride/acetate. |
| Bis(trichlorethylideneglyceryl)formal. | RO\CH₂/RO | Colourless viscous liquid | Cellulose acetate and triacetate. |
| Bis(trichlorethylideneglyceryl)trichloroacetal. | RO\CH.CCl₃/RO | Highly viscous undistillable liquid. | Cellulose triacetate and acetate, polyvinyl chloride and chloride/acetate. |
| Bis(trichlorethylideneglyceryl)adipate. | COOR(CH₂)₄COOR | Viscous undistillable liquid. | Cellulose triacetate (limited miscibility range). |
| Bis(trichlorethylideneglyceryl)sebacate. | COOR(CH₂)₈COOR | ----do---- | Do. |

The invention may be illustrated by the following examples in which all parts are parts by weight.

Example 1

50 parts of cellulose acetate of combined acetic acid content of 52–56% are mixed on hot rolls at about 125° C. with 30 parts of trichlormethyldioxolan and the homogeneous mass thereby obtained is moulded at about 140° C. After cooling a clear light coloured moulding is obtained which shows marked non-inflammable properties.

vessel, 15 parts of tetrahydrofuran being gradually added during the process, which is continued until solution is substantially complete. The resulting lacquer, after clarification by filtration, centrifuging, or sedimentation as is customary in the art, yields clear, tough, glossy, moisture- and heat-resistant films on air drying.

Example 4

2 parts of cellulose acetate (of combined acetic acid content 52–56%), 1 part of 4-chloromethyl 2-trichloromethyl dioxolan 1:3, and 25 parts of acetone are agitated together in a closed vessel until solution of the cellulose acetate is complete. The product is flowed out on to a horizontal glass plate and allowed to dry, after which it is stripped to yield a clear, flexible, moisture-resistant foil.

*Example 5*

As in Example 4, except that 1 part of trichlorethylideneglyceryl acetate is substituted for 1 part of 4-chloromethyl 2-trichloromethyl dioxolan 1:3. A product similar to that of Example 4 is obtained.

*Example 6*

As in Example 3, except that 0.5 part of 4-chloromethyl 2-trichloromethyl dioxolan 1:3 is substituted for 0.5 part of trichlorethylidene glycerol. A product similar to that of Example 3 is obtained.

*Example 7*

As in Example 3, except that 0.5 part of bis (trichlorethylideneglyceryl) formal is substituted for 0.5 part of trichlorethylidene glycerol. A product similar to that of Example 3 is obtained.

*Example 8*

As in Example 3, except that 0.5 part of bis (trichlorethylideneglyceryl) trichloroacetal is substituted for 0.5 part of trichlorethylidene glycerol. A product similar to that of Example 3 is obtained.

*Example 9*

As in Example 3, except that 0.5 part of bis (trichlorethylideneglyceryl) adipate is substituted for 0.5 part of trichlorethylidene glycerol. A product similar to that of Example 3 is obtained.

Following the general procedure shown in the above examples cellulose acetate, polyvinyl chloride or other plastic materials such as a cellulose ester other than cellulose acetate, a mixed ester of cellulose, e. g. cellulose acetobutyrate, a cellulose ether e. g. ethyl cellulose, a co-polymer of vinyl chloride and vinyl acetate, a polyvinyl acetal, polystyrene, rubber, or a synthetic elastomer such as polymerised chlorobutadiene known commercially as "neoprene," or the range of alkylene polysulphide polymers known commercially as "Thiokol" may be plasticised with suitable amounts of any of the cyclic acetals, whose suitability therefor is indicated in the foregoing table.

We declare that what we claim is:

Plastic mass comprising cellulose acetate having a combined acetic acid content of about 62.5% and as a plasticizer a cyclic acetal of the following formula

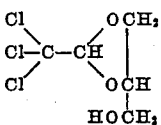

HARRY JONES.
JOHN KEMPTON AIKEN.

REFERENCES CITED

The following references are of record in the file of this patent:

UNITED STATES PATENTS

| Number | Name | Date |
| --- | --- | --- |
| 2,057,141 | Eichengrun | Oct. 13, 1936 |
| 2,245,260 | Dickey et al. | June 10, 1941 |
| 2,447,459 | Famulener | Aug. 17, 1948 |